United States Patent
Jenkins et al.

(10) Patent No.: US 10,687,136 B2
(45) Date of Patent: Jun. 16, 2020

(54) SYSTEM AND METHOD OF USER INTERFACE FOR AUDIO DEVICE

(71) Applicant: Google LLC, Mountain View, CA (US)

(72) Inventors: Tom Jenkins, London (GB); Henry Holland, London (GB); Nicole Kobilansky, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/337,548

(22) PCT Filed: Nov. 21, 2017

(86) PCT No.: PCT/US2017/062780
§ 371 (c)(1),
(2) Date: Mar. 28, 2019

(87) PCT Pub. No.: WO2018/098150
PCT Pub. Date: May 31, 2018

(65) Prior Publication Data
US 2020/0037059 A1     Jan. 30, 2020

Related U.S. Application Data

(60) Provisional application No. 62/427,003, filed on Nov. 28, 2016.

(51) Int. Cl.
*H04R 1/00* (2006.01)
*G06F 3/16* (2006.01)
*H04R 1/10* (2006.01)

(52) U.S. Cl.
CPC .......... *H04R 1/1041* (2013.01); *G06F 3/165* (2013.01); *H04R 1/1016* (2013.01); *H04R 2420/07* (2013.01)

(58) Field of Classification Search
CPC ...... H04R 1/10; H04R 1/1016; H04R 1/1041; H04R 2420/07; H04R 2430/01;
(Continued)

(56) References Cited

U.S. PATENT DOCUMENTS

2002/0003889 A1 * 1/2002 Fischer ............... H04R 1/1041
381/370
2005/0219221 A1 * 10/2005 Ohkuri .................. G08C 19/00
345/169

(Continued)

FOREIGN PATENT DOCUMENTS

WO     2009091660 A1    7/2009

OTHER PUBLICATIONS

International Search Report and Written Opinion dated Mar. 6, 2018, for International Application No. PCT/US2017/062780. 15 pages.

(Continued)

*Primary Examiner* — Thang V Tran
(74) *Attorney, Agent, or Firm* — Shumaker & Sieffert, P.A.

(57) ABSTRACT

The disclosure provides for an audio accessory that includes earbuds or earphones, an input device, and a processor. The input device includes a first button and optionally includes additional buttons or touch sensors. The processor is configured to initiate an action when a first input is received at the first button, provide audio updates when a second input is received at the first button, and prepare the input device to receive audio input when a third input is received at the first button. Also, the processor is configured to silence a currently playing audio message and initiate playing a next audio message when a fourth input is received at one of the buttons or the touch sensors, and silence and mark the currently playing audio message for no further playback (Continued)

when a fifth input is received at one of the buttons or the touch sensors.

20 Claims, 12 Drawing Sheets

(58) Field of Classification Search
CPC .......... G06F 3/165; G06F 3/02; G06F 3/0416; G06F 3/0487; G06F 3/0488
See application file for complete search history.

(56) References Cited

U.S. PATENT DOCUMENTS

| | | |
|---|---|---|
| 2007/0247446 A1 | 10/2007 | Orsley et al. |
| 2009/0095605 A1* | 4/2009 | No .................. H04R 1/1041 200/1 B |
| 2009/0179768 A1* | 7/2009 | Sander .............. H04R 1/1041 340/13.27 |
| 2009/0180643 A1* | 7/2009 | Sander .............. H04R 1/1041 381/111 |
| 2012/0051554 A1* | 3/2012 | Modi .................. H04R 3/00 381/74 |
| 2013/0129110 A1* | 5/2013 | Harper .............. H04R 1/1041 381/74 |
| 2016/0098138 A1* | 4/2016 | Park .................. G06F 3/0416 345/173 |
| 2016/0227311 A1* | 8/2016 | Ushakov ........... H04R 1/1033 |
| 2016/0277827 A1* | 9/2016 | Woo .................. H04R 1/1041 |
| 2017/0150245 A1* | 5/2017 | Armstrong ........ H04R 1/1025 |

OTHER PUBLICATIONS

Response to Rule 161(1)1162 EPC dated Jun. 3, 2019, from counterpart European Application No. 17822499.4, filed Nov. 20, 2019, 16 pp.

International Preliminary Report on Patentability from International Application No. PCT/US2017/062780, dated May 28, 2019, 9 pp.

* cited by examiner

1000

SYSTEM AND METHOD OF USER INTERFACE FOR AUDIO DEVICE

CROSS-REFERENCE TO RELATED APPLICATIONS

The present application is a national phase entry under 35 U.S.C. § 371 of International Application No. PCT/US2017/062780, filed Nov. 21, 2017, which claims the benefit of the filing date of U.S. Provisional Application No. 62/427,003, filed Nov. 28, 2016, entitled SYSTEM AND METHOD OF USER INTERFACE FOR AUDIO DEVICE, the disclosures of which are hereby incorporated herein by reference.

BACKGROUND

Audio accessories, such as ear buds and headsets, are commonly used with mobile computing devices to allow for hands-free use of a mobile device. Such audio accessories can be wirelessly connected or directly connected to the mobile computing devices through wires extending from the ear buds or headset. Improved methods and devices are needed to improve a user's ability to more easily communicate with the mobile computing device.

BRIEF SUMMARY

Aspects of the disclosure provides for a user interface for an audio device that allows for a compact and intuitive way to provide instructions to one or more computing devices. The audio device includes a positive control and hush control that receives a variety of user input. Using these controls, a variety of tactile input may be received at the audio device for controlling the one or more computing devices.

DETAILED DESCRIPTION

Example Systems

Figure 1:
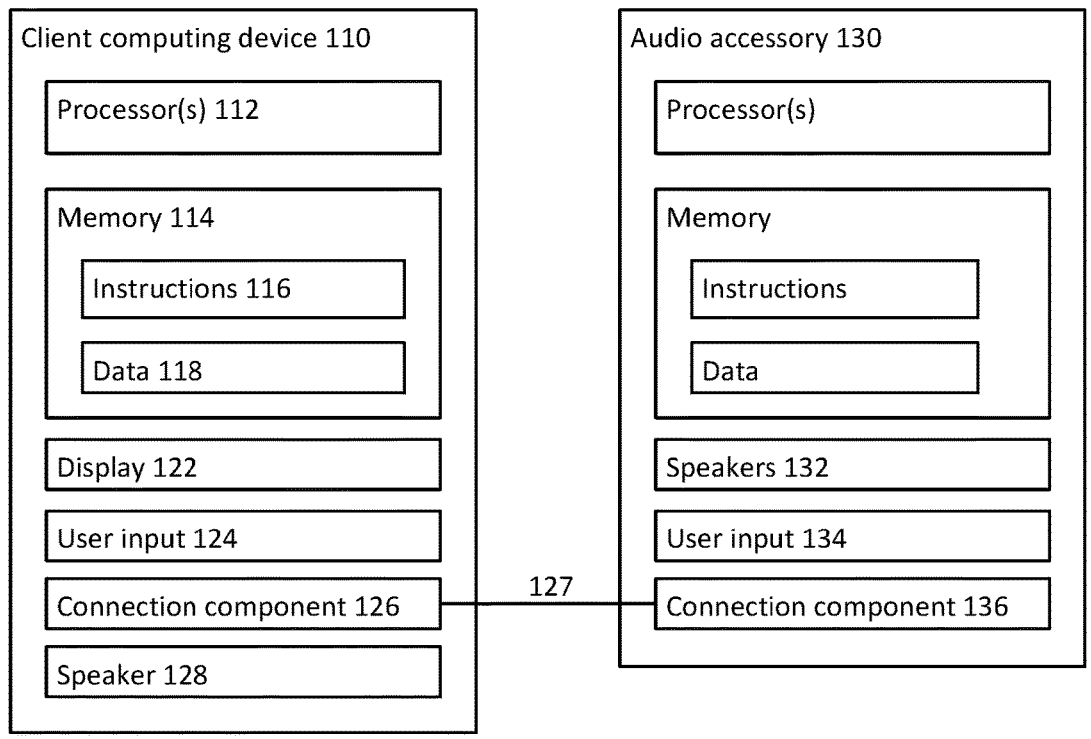
FIG. 1 is a functional diagram of example systems in accordance with aspects of the disclosure.
Figure 1:
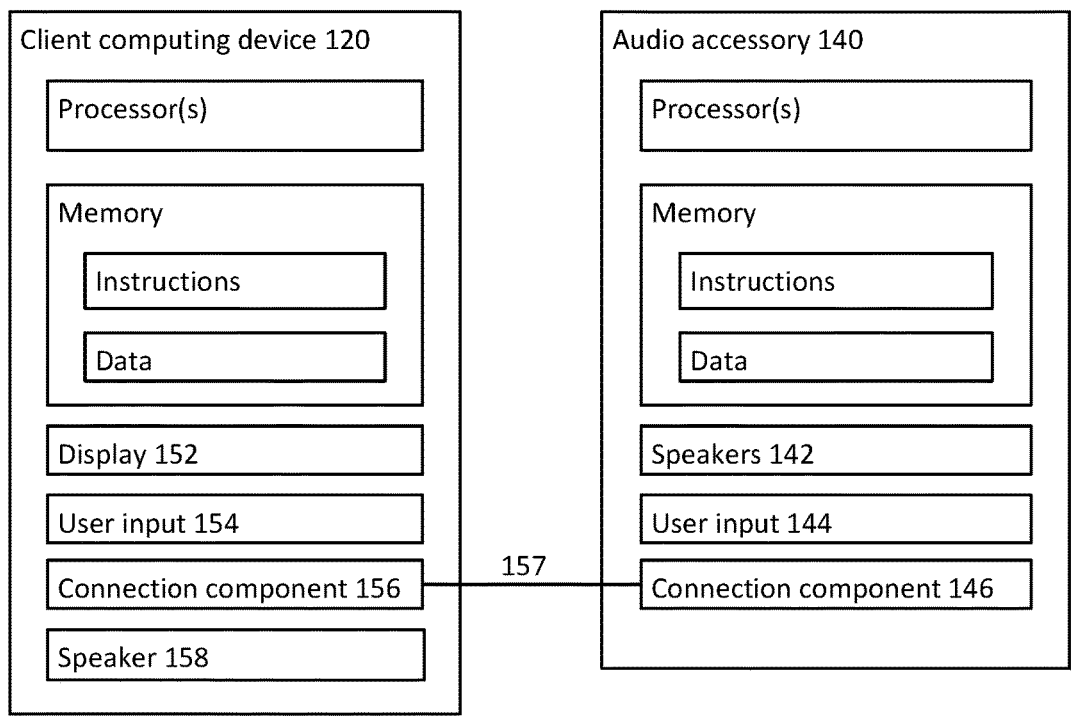
Figure 2:
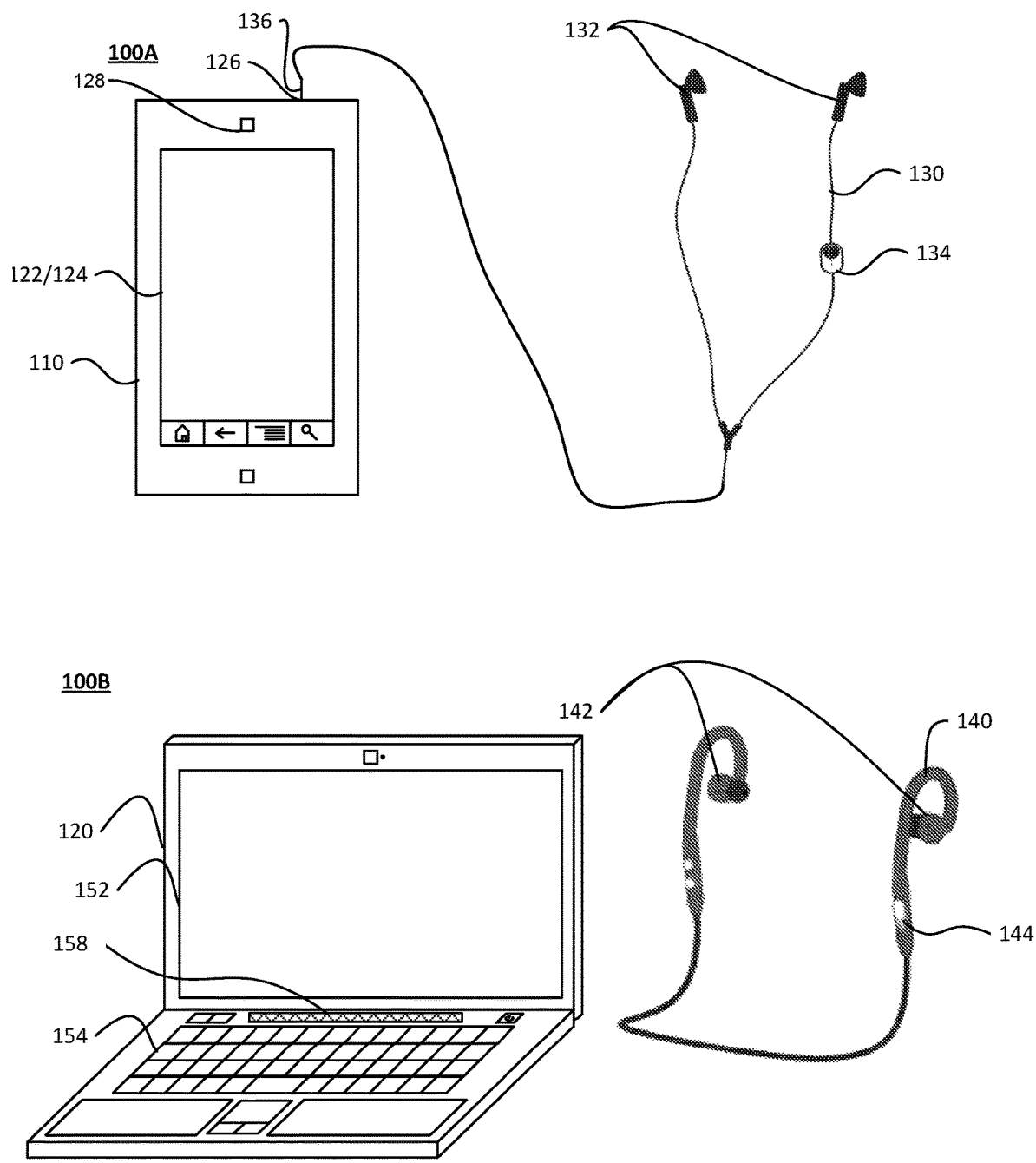
FIG. 2 a pictorial diagram of the example systems of FIG. 1 in accordance with aspects of the disclosure.

FIGS. 1 and 2 include example systems 100A and 100B in which the features described herein may be implemented. It should not be considered as limiting the scope of the disclosure or usefulness of the features described herein. In this example, system 100 can include computing devices 110, 120, 130, 140. Each of the computing devices 110, 120, 130, 140 can contain one or more processors 112 and memory 114 (reference numbers depicted only within computing device 110 for simplicity) as well as various other components as discussed below.

Memory 114 of the computing devices 110, 120, 130, 140 can store information accessible by the one or more processors 112, including instructions 116 that can be executed by the one or more processors 112. Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing devices 110, 120, 130, 140 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110, 120, 130, 140. Accordingly, references to a processor, computer, computing device, or memory will be understood to include references to a collection of processors, computers, computing devices, or memories that may or may not operate in parallel.

Each computing device 110, 120, 130, 140 may be a mobile computing device capable of wirelessly exchanging data with a server over a network such as the Internet. For instance, client computing device 110 may be a device such as a mobile phone, wireless-enabled PDA, a tablet PC, or a netbook. Client computing device 120 may be a full a full-sized personal computing device. The client computing devices 110 and 120 may have all of the components normally used in connection with a personal computing device such as processors and memory discussed above as well as a display such as displays 122 or 152 (e.g., a touch-screen, a projector, a television, a monitor having a screen, or other device that is operable to display information), and user input device 124 or 154 (e.g., a mouse, keyboard, touch-screen or microphone). The client computing device 110 and 120 may also include connection components 126 or 156 (shown only in FIG. 1) that facilitate wired, such as via a jack, or wireless connections 127 or 157, such as via WiFi or Bluetooth protocols, with audio accessories 130, 140. The client computing device may also include a camera for recording video streams, speakers, a network interface device, and all of the components used for connecting these elements to one another.

Computing devices 130 and 140 may be audio accessory devices configured to communicate via wired or wireless connection 127, 157 with one or more of client computing devices 110 or 120. For instance the audio accessory device 130 may include one or more speakers 132 including earphones or earbuds for generating sound, a user an input device 134 to allow a user to input instructions to the audio accessory device and also computing device 110 as discussed below, and a connection component 136, such as an audio jack, for mating with an audio port of computing device 110 (not shown). Similarly, the audio accessory device 140 may include one or more speakers 142 including earphones or earbuds for generating sound, a user an input device 144 to allow a user to input instructions to the audio accessory device and also computing device 110 as discussed below, and a connection member 146, such as a wireless transmitter and receiver, for wirelessly communicating information to the processor of computing device 120.

Example Audio Accessories

Figure 3A:
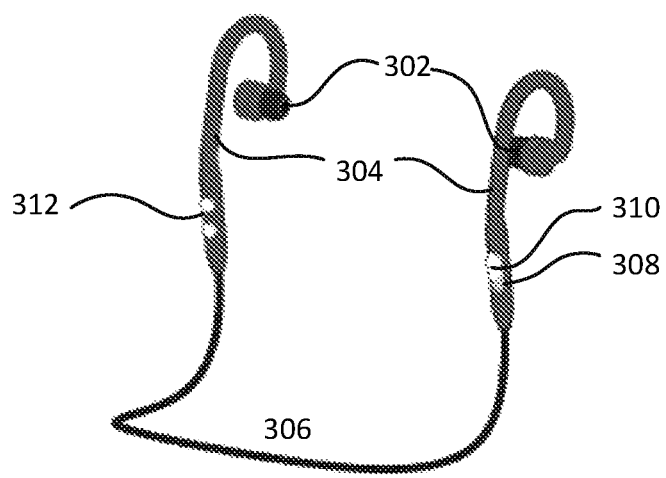
FIGS. 3A-3C are pictorial diagrams of example audio devices in accordance with aspects of the disclosure.
Figure 3A:
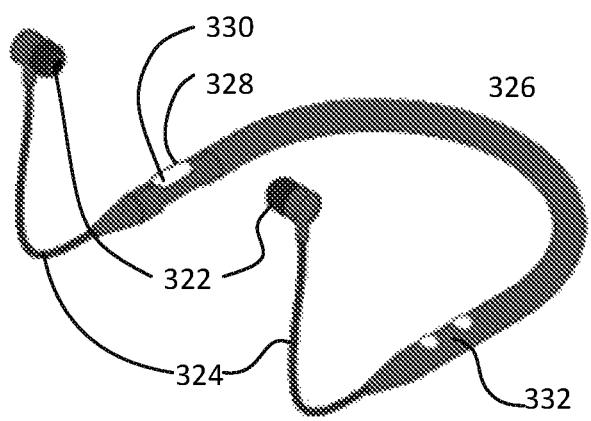
Figure 3A:
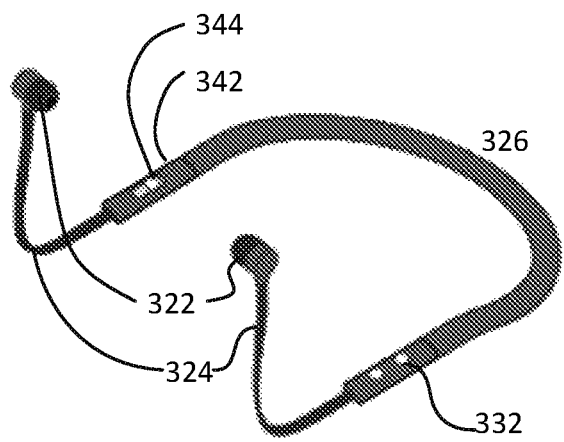

An audio accessory 300, corresponding to either audio accessory 130 or 140, as shown in FIG. 3A, includes a pair of ear phones or ear buds 302 (corresponding to speakers 132 or 142) attached to a respective ear hooks 304 with a wire 306 respectively extending from one ear hook to the other, as well as an input device 308 (corresponding to input device 134 or 144) with a sliding button 310. Ear hooks 304 are configured to fit behind user's ears when ear phones or ear buds 302 are worn in user's ears. Wire 306 is configured to hang behind a user's head, neck, or shoulders when earphones or ear buds 32 are worn in user's ears. The input device 308 is positioned along one of the ear hooks 304 and provides a user with the ability to communicate (directly or indirectly) with a client computing device, such as client computing devices 110 or 120, using tactile inputs (clicks and/or sliding) or a combination of voice and tactile inputs. Sliding button 310 is configured to slide in one direction from a resting position along ear hook 302. Volume controls 312 are positioned along an opposite ear hook 304 and includes volume up and volume down buttons.

An audio accessory 320, corresponding to either audio accessory 130 or 140, as shown in FIG. 3A, includes a pair of ear phones or ear buds 322 (corresponding to speakers 132 or 142) attached to respective wires 324 that connect to respective ends of a U-shaped band 326, as well as an input device 328 (corresponding to input device 134 or 144) with a button 330 and touch sensors (not shown) disposed on two sides of button 330. Band 326 is configured to sit around a user's neck when ear phones or ear buds 322 are worn in user's ears. Wires 324 are configured to hang down from user's ears when earphones or ear buds 32 are worn in user's ears. The input device 328 is positioned along one of the arms of band 326 and provides a user with the ability to communicate (directly or indirectly) with a client computing device, such as client computing devices 110 or 120, using tactile inputs or a combination of voice and tactile inputs. Volume controls 332 are positioned along an opposite arm of band 326 and includes volume up and volume down buttons.

Audio accessory 340, corresponding to either audio accessory 130 or 140, as shown in FIG. 3A, also includes ear phones or ear buds 322, wires 324, band 326, input device 342, and volume controls 332. Input device 342 has sliding button 344 that is configured to slide in two directions from a resting position along the arm of band 326.

Figure 3B:
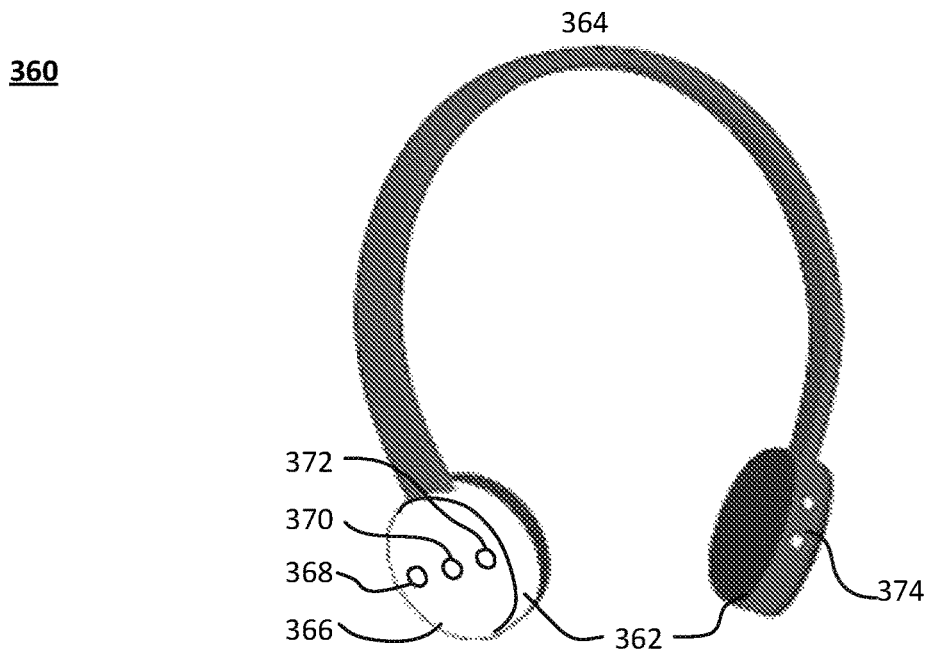
Figure 3B:
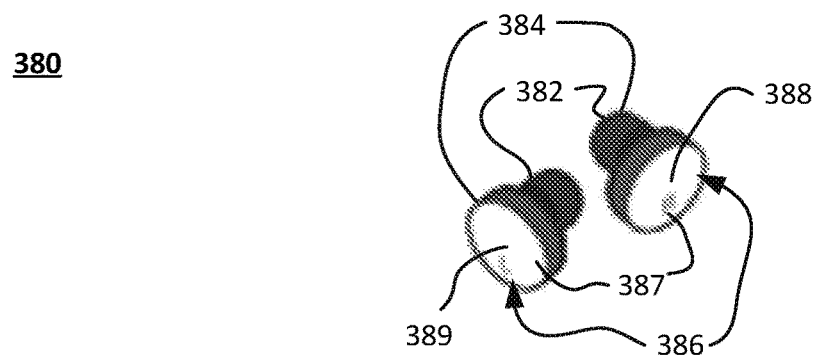
Figure 3B:

An audio accessory 360, corresponding to either audio accessory 130 or 140, as shown in FIG. 3B, includes a pair of ear phones 362 (corresponding to speakers 132 or 142) attached to respective ends of a generally C- or U-shaped band 364, as well as an input device 366 (corresponding to input device 134 or 144) with a buttons 368, 370, 372. Band 326 is configured to fit around and over a portion of a user's head when ear phones 362 are worn on user's ears. The input device 366 is positioned on an outer housing of one of the ear phones 362 and provides a user with the ability to communicate (directly or indirectly) with a client computing device, such as client computing devices 110 or 120, using tactile inputs or a combination of voice and tactile inputs. Volume controls 374 are positioned on an outer housing of an opposite ear phone 362 and include volume up and volume down buttons.

An audio accessory 380, corresponding to either audio accessory 130 or 140, as shown in FIG. 3B, includes a pair of wireless ear buds 382 (corresponding to speakers 132 or 142) having a housing 384 with outer surfaces 386, as well as an input devices 387 (corresponding to input device 134 or 144) with touch sensors (not shown). The touch sensors may be positioned on the outer surfaces 386 to form buttons 388, 389. Housing 384 is configured to have outer surface 386 facing outward and substantially parallel to a user's ear lobe when ear buds 382 are worn in user's ears. Volume controls are not included in audio accessory 380.

Figure 4:
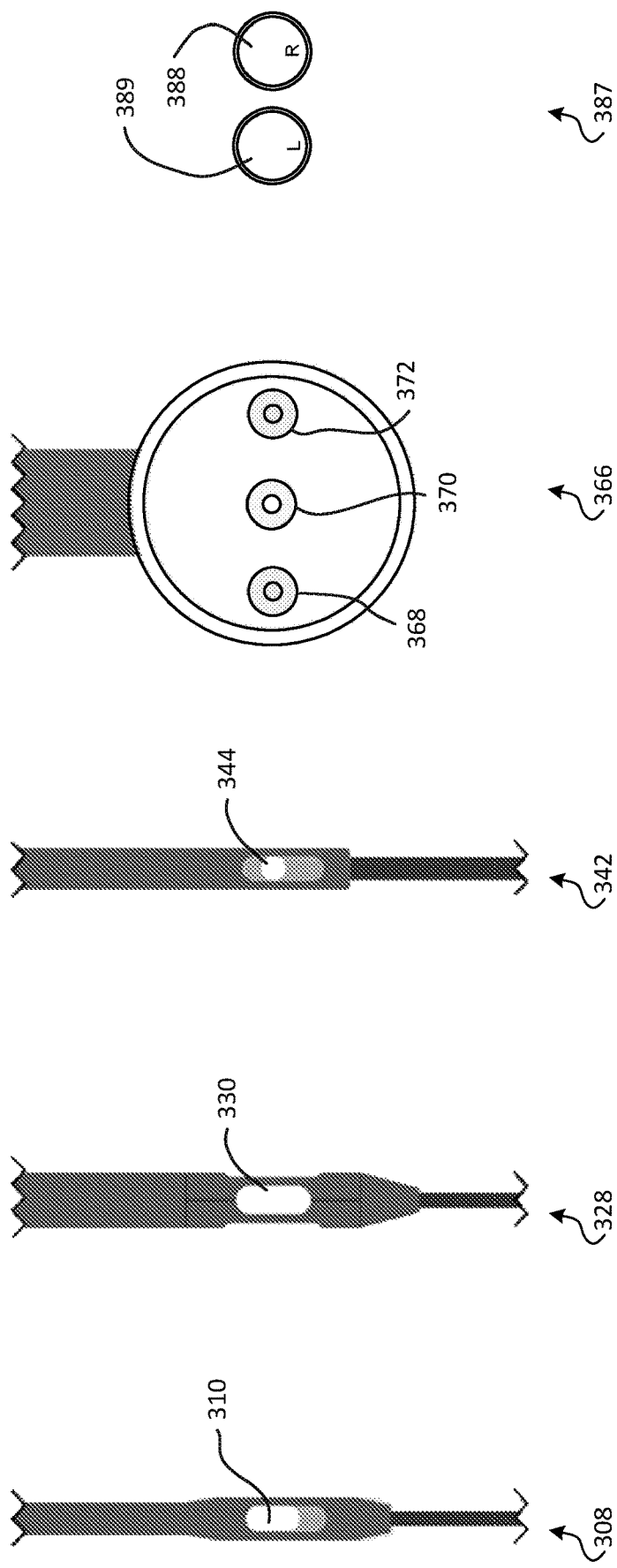
FIG. 4 shows zoomed-in views of example input devices of the example audio devices of FIGS. 3A-3B in accordance with aspects of the disclosure.

The input devices 308, 328, 342, 366, 387, which are illustrated in FIG. 4, are shown as being a part of ear phones or ear buds, ear hooks, or bands, but in other examples, the input device may be a separate and standalone audio accessory that wirelessly communicates with one or more other audio accessories. As shown, for example, in FIG. 3B, the audio accessory 390 may be similar to audio accessory 130 or 140, having input device 392 with sliding button 394. Sliding button 394 is configured to slide in one direction from a resting position along a channel 396. Although not necessary, in some instances, audio accessory 390 may not include speaker 132 or be physically connected to speaker 132. Audio accessory 390 can wirelessly communicate with one or more other audio accessories, including wireless earbuds, a wireless speaker 260 (corresponding to speakers 132), or speaker 128 of computing device 110. Audio accessory 390 can provide a user with a convenient way to communicate with another audio accessory or a computing device 110. Due to its size, the audio accessory 390 can be placed in the pocket of a user, clipped to the clothing of a user, or stored in any other convenient user location.

Figure 3C:
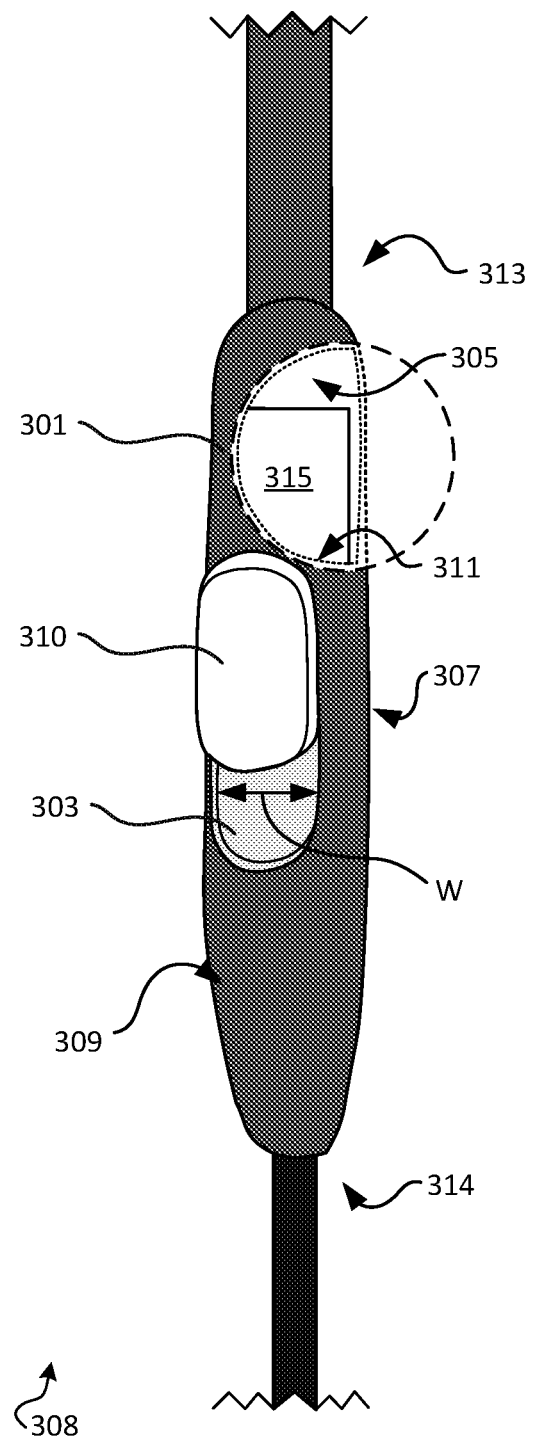

An input device, such as input device 308 shown in FIG. 3C, may include an outer housing 301, an elongated channel 303, and a sliding button 310 disposed within the elongated channel 303. The input device may allow a user to communicate with a computing device, such as computing device 110 or 120. For instance, user input may be sent directly to the processors in the computing devices 110 or 120 or to indirectly to the processors within the input device that provide instructions to the computing devices 110 or 120.

The outer housing, such as outer housing 301, may have various configurations. The outer housing 301 may include an interior base surface 305, an exterior base surface 307, an outer top surface 309, an interior top surface 311, a first end 313 and a second end 314 that is opposite the first end 313. The channel, such as channel 303, may have a channel opening that extends along a majority of the length of the outer top surface of the outer housing. The outer housing can enclose an interior space configured to house various components of the input device, such as component 315. The outer housing may be comprised of any number of materials, including a plastic resin.

The overall shape of the outer housing may be oblong with rounded edges, such as the shape of the outer housing 301, but in other examples, the shape may vary. For example, the outer housing may alternatively be in the shape of a rectangle or a square. The outer housing may be comprised of any number of materials, including a plastic resin.

Electronic components, such as component 315, may be disposed within the interior of the outer housing. A printed circuit board, for example, may be positioned adjacent the interior base surface. The printed circuit board can include circuitry necessary for the input device to communicate with the computing devices 110 or 120. The printed circuit board may be a flat and rigid board, but other types of circuit boards, such as flexible circuit boards, can be utilized. A first circuit board contact and a second circuit board contact may be disposed along the outer surface of the printed circuit board.

As with the outer housing, the sliding button may have various configurations and may be comprised of any number of materials, including a plastic resin. The sliding button, such as the sliding button 310, may be u-shaped and include an interior arm joined with an exterior arm by a neck.

The exterior arm can overlie the top surface of the housing. Exterior arm can include an outer contact surface configured to receive a finger of a user and to allow a user to operate the sliding button. In one example, the outer surface can be contoured to the shape of a finger or include surface dimpling, knurling, or roughenings to facilitate use of the sliding button by a user's finger. An interior contact surface of the exterior arm may be spaced away from the outer top surface of the outer housing by a distance X, which provides the clearance needed for the sliding button to move in a vertical direction between the top and bottom surfaces of the housing.

The interior arm may be an elongated arm positioned within the interior portion of the outer housing. A button contact facing toward the interior base surface of the housing may be provided at one end of the interior arm. Button tabs may extend from the neck and a magnet may be provided adjacent the button tabs, or alternatively, within the one or both button tabs biasing element, which can include, for example, a spring, may be positioned at or near the second end of the interior arm. As shown, the spring may be provided around at least a portion of the interior arm to bias the interior arm and the sliding button toward the first end of the channel.

The sliding button may be configured to move along the channel between a resting position adjacent a first end of the channel and a actuated position adjacent a second end of the channel. The channel may have a channel opening extending across the top surface, as well as a width W extending between channel sidewalls. The neck of the sliding button may be sized to fit within the channel opening. The button tabs extending away from the neck and toward the channel sidewalls may be sized to fit within the channel.

A position sensor may also be provided on one or both channel sidewalls. In one example, the position sensor is a hall sensor, but other types of position sensors may additionally or alternatively be used.

Figure 5:
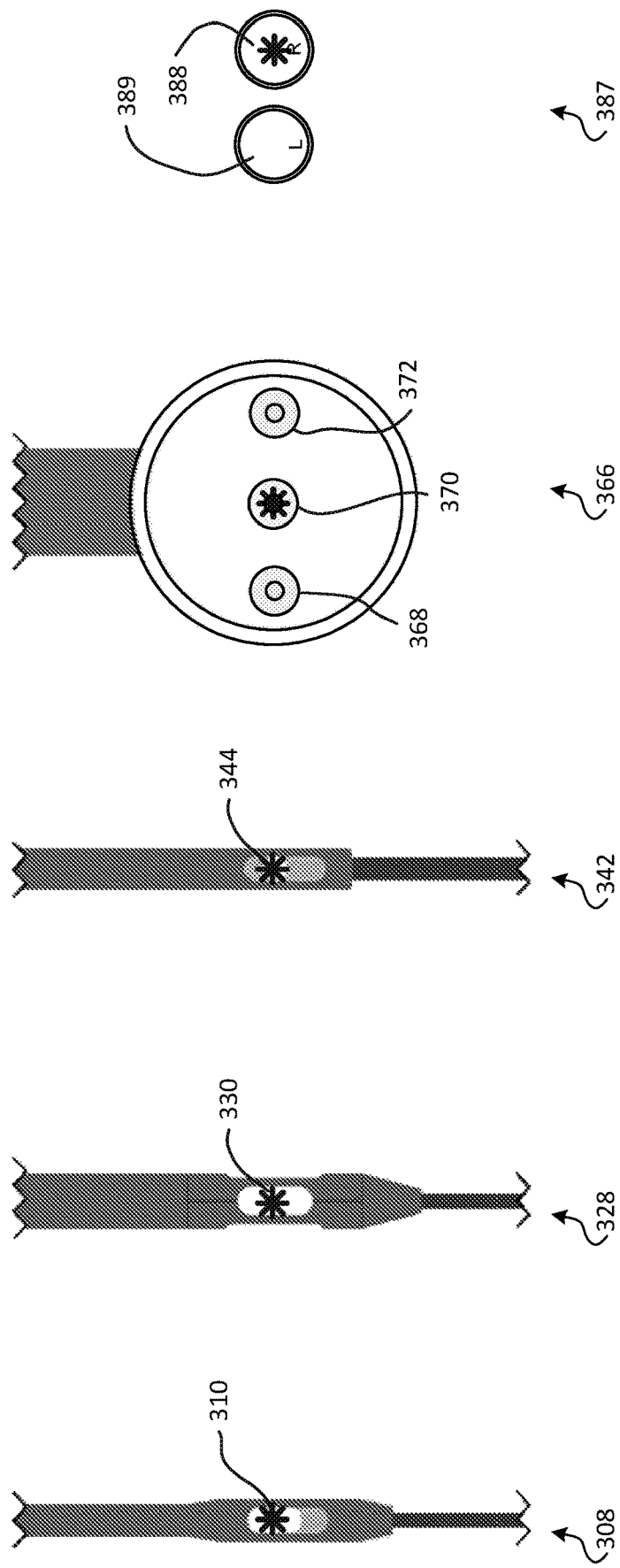
FIG. 5 shows an example operation of the example input devices of FIG. 4 in accordance with aspects of the disclosure.

The sliding button 308 as shown in FIGS. 3C, 4, and 5 is in an example resting position or "stationary" position. In the resting position, the sliding button is positioned adjacent first end of the channel and adjacent the first end of the housing due to the biasing force of the spring. In other words, the spring biases the button towards the first end so that the button is at rest in the resting position. In this position, the button contact of the first interior arm can also directly overlie the first contact on the printed circuit board while in the stationary position.

Figure 6:
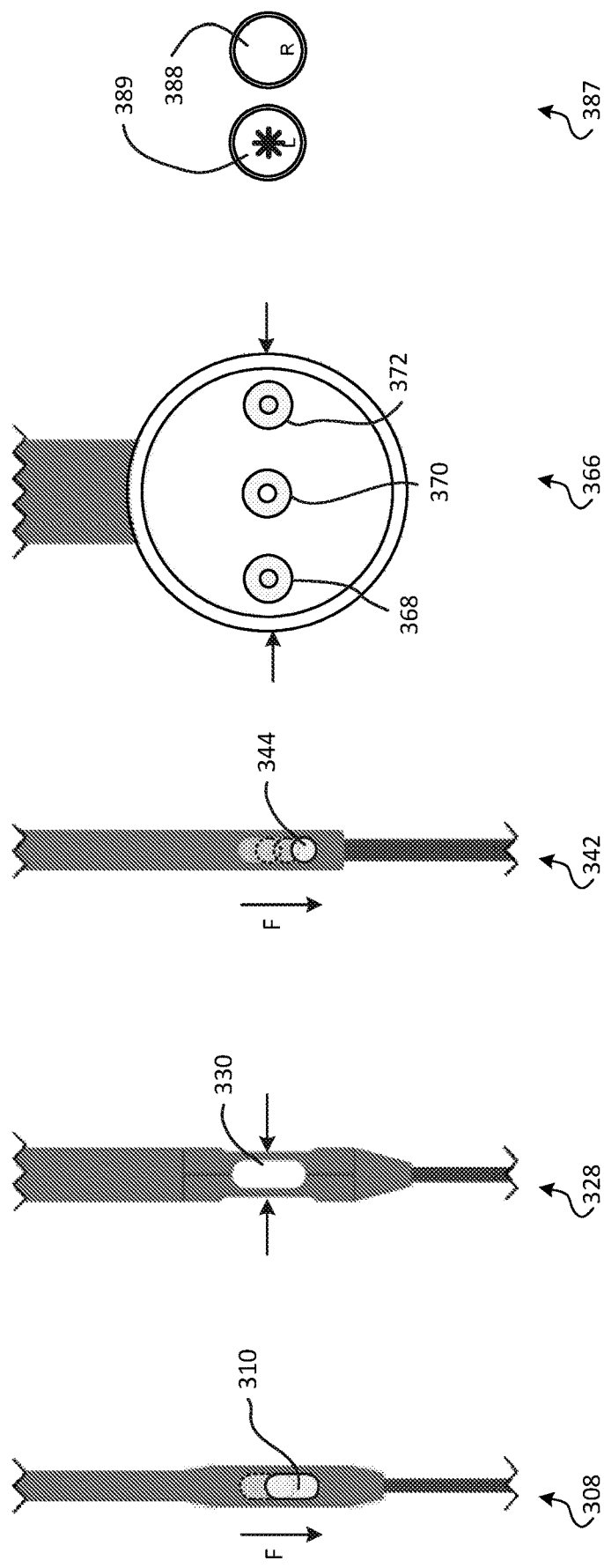
FIG. 6 shows another example operation of the example input devices of FIG. 4 in accordance with aspects of the disclosure.
Figure 7:
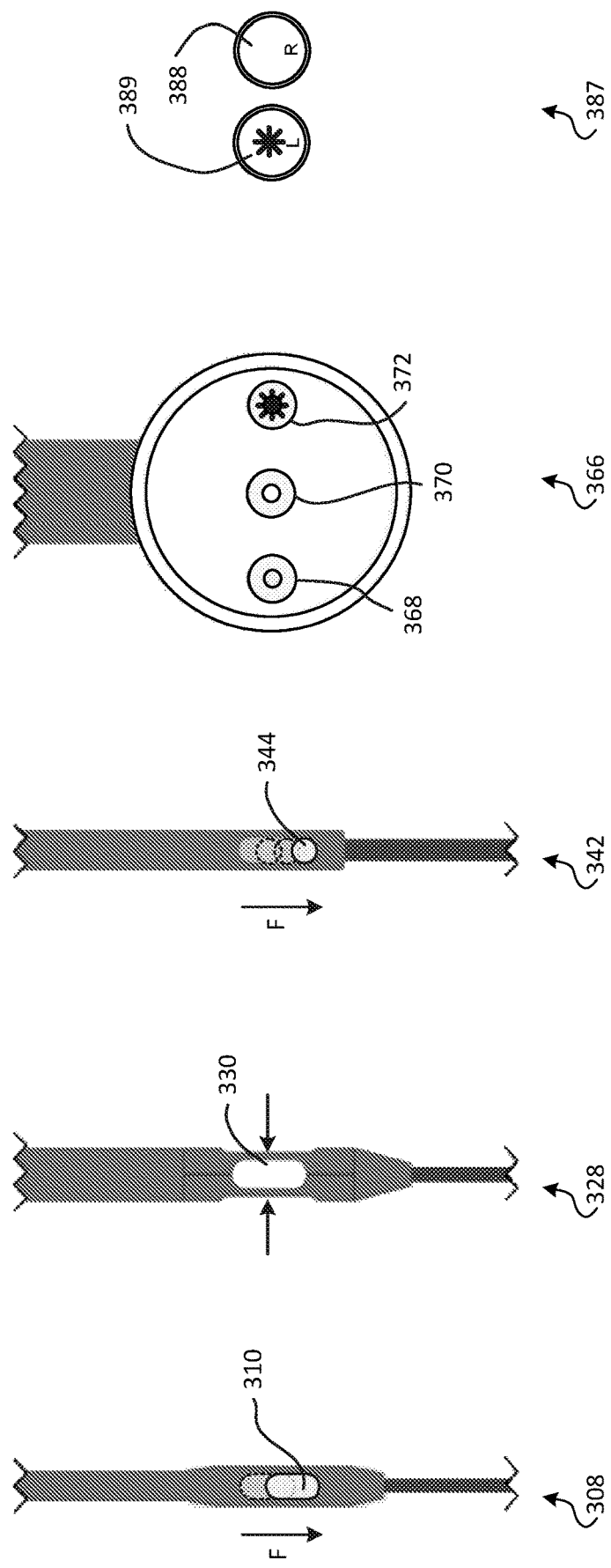
FIG. 7 shows further example operation of the example input devices of FIG. 4 in accordance with aspects of the disclosure.

To move into an actuated position, the sliding button 308 as shown in FIGS. 6 and 7 is configured to move within the channel between the first end and second end of the housing, as well as between the first end and the second end of the channel A force F can be applied to the sliding button in a direction that is towards the second end of the channel or a direction which is opposite of the biasing force of the spring, so as to overcome the biasing force of the spring towards the first end of the channel. The button tabs extending from the neck of the sliding button can guide the sliding button along the channel. The sliding button can be moved from the resting position, at the first end of the channel, along the channel towards the second end of the channel. The sliding button continues to move along the channel until the sliding button reaches the second end of the channel.

In one example, the actuated position, as shown in FIGS. 6 and 7, is reached when the button tabs contact the second end of the channel. As the sliding button slides along the channel, the interior arm compresses the spring. The spring will continue to compress until the sliding button is positioned adjacent the second end of the channel.

In the actuated position, the spring will continue to bias the sliding button towards the resting position. Thus, when the force F is released or removed, the sliding button will return to the resting position.

As noted above, the input device may also include a position sensor to detect movement of the sliding button along the channel. When the sliding button is moved from the resting position at the first end of the channel toward the second end of the channel into the actuated position, the position sensor will detect the change in position of the magnet in the neck. In other words, the distance between the magnet and the position sensor will be different when the sliding button is in the resting position and when the sliding button is in the actuated position. In this regard, the magnet will also have a resting position and a second activated position corresponding to the resting position and the second active position. Upon detection of a change in a position of the magnet from the resting position to the second activated position of the magnet by the position sensor, the position sensor will emit a signal indicating movement of the sliding button into the actuated position.

The signal can be received by processors within the input device that will send instructions to the computing device 110 or 120 to perform a first pre-determined command or function, such as canceling or initiating a particular action being performed by the computing device 110 or 120. Alternatively, the signal can be directly received by processors within the computing device 110 or 120.

The sliding button may be further depressed in the resting position, as well as in the actuated position, to initiate an action by the client computing device 110 or 120. As shown in the example of FIG. 5, when the sliding button is in the resting position, the sliding button can be depressed in a vertical or y-direction relative to the outer top surface of the outer housing. The depression of the sliding buttons 310 and 344 are illustrated in FIG. 5 as an asterisk. Movement of the sliding button in the y-direction causes the button tabs of the sliding button to move into the first vertical channel, which extends from the channel. Such movement further reduces the distance X between the interior contact surface of the exterior arm and outer top surface of the input device housing so that the interior surface is directly adjacent top surface. Button contact on the sliding button can then make contact with the circuit board contacts of the printed circuit board. When the button contact contacts the first circuit board contact, a signal can be generated by the circuit board that will instruct the client computing device 110 or 120 to perform a second pre-determined function. For example, the signal may instruct the client computing device 110 or 120 to initiate a voice command prompt.

Similarly, when the sliding button is in the actuated position, such as the sliding buttons 310 and 344 shown in FIGS. 6 and 7, the button contact 260 can overlie the second board contact on the printed circuit board. In the actuated position, the sliding button can also be depressed in a vertical or y-direction relative to the outer top surface of the outer housing. When moved in the vertical direction, the button contact can make contact with the second circuit board contact of the printed circuit board. A signal can be generated by processors in the printed circuit board that will be received by the client computing device 110 or 120 to perform a pre-determined function. For example, when in the actuated position, a signal can be generated that instructs the client computing device 110 or 120 to close an application currently running on the client computing device or some other activity currently being executed by the client computing device.

Figure 8:
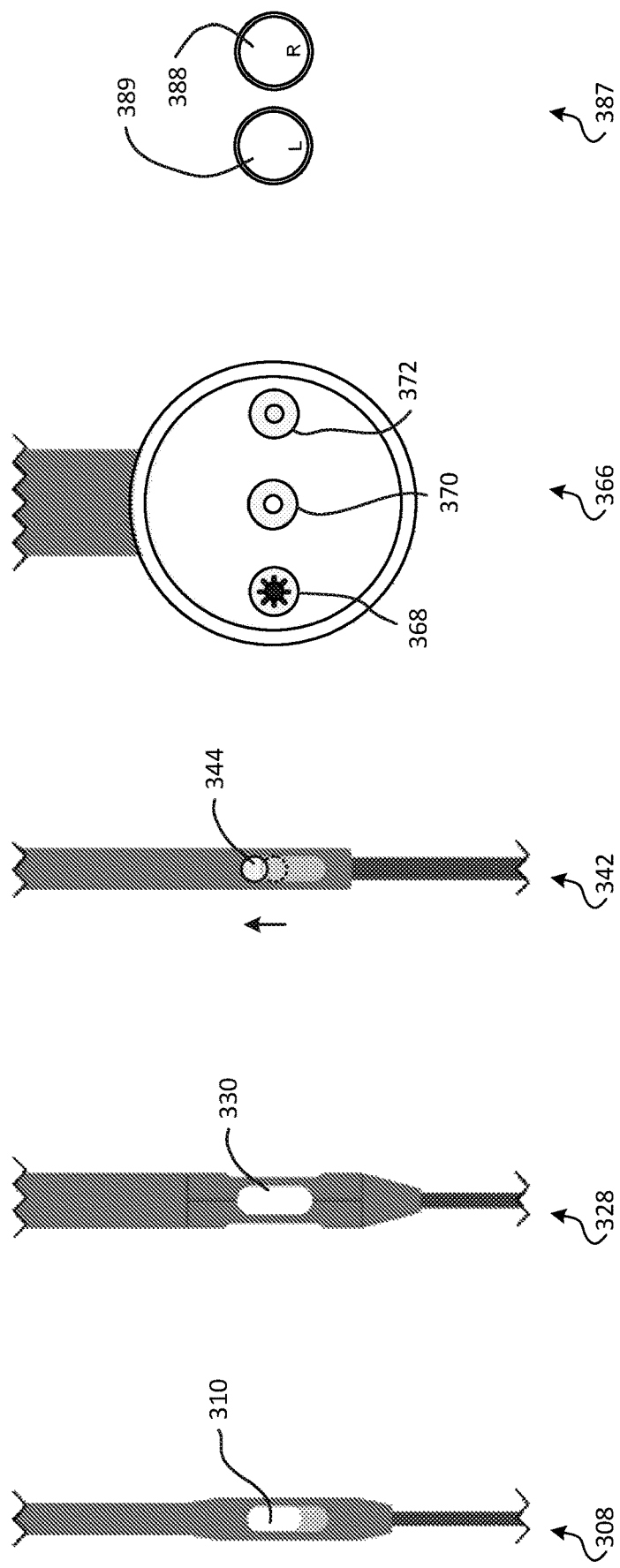
FIG. 8 shows yet another example operation of the example input devices of FIG. 4 in accordance with aspects of the disclosure.

In some implementations, the sliding button, such as in sliding button 344 shown in FIG. 8, may be biased at a position between the first end and the second end of the channel. In addition to being configured to move to a first actuated position shown in FIGS. 6 and 7, the sliding button may also be configured to move to a second actuated position by sliding in the opposite direction than the first actuated position. The button contact may overlie a third circuit board contact on the printed circuit board when the sliding button is in the second actuated position. The sliding button may also be depressed in a vertical or y-direction relative to the outer top surface of the outer housing in the second actuated position, such that the button contact makes contact with the third circuit board contact. A signal can be generated by processors in the printed circuit board that will be received by the client computing device 110 or 120 to perform a pre-determined function.

Prolonged depression of the sliding button can initiate yet other pre-determined functions that are to be performed by the client computing device 110 or 120. By way of one example, holding the sliding button depressed for a prolonged period of time causes the button contact to be in contact with the first circuit button contact, second circuit board contact, or third circuit board contact for an extended period of time. The extended period of time may be any pre-set period of time, such as two or more seconds. In one example, prolonged depression of the button while in the resting position places the button contact in contact with the first circuit board contact for a prolonged period of time. This prolonged depression can initiate, for example, a voice command mode of the client computing device. Similarly, prolonged depression of the button while in the actuated position places the button contact in contact with the second circuit board contact for an extended period of time. This prolonged depression can also initiate, for example, a voice command mode of the client computing device 110 or 120.

Rapid successive movement of the sliding button can also initiate other pre-determined functions at the client computing device 110 or 120. For example, rapid successive movement of the sliding button in a vertical or y-direction relative to the top surface of housing while in the resting position or the second stationary position can be used to "click" the button and initiate still other functions. In the resting position, the button contact will rapidly contact the first circuit board. Similarly, in the actuated position, the button contact will rapidly contact the second circuit board contact. The processors can be pre-programmed to recognize the multiple clicks as a particular command or function and send pre-determined signals to the client computing device 110 or 120 based on the number and location (first circuit board contact or second circuit board contact).

In another example, rather than the button contact of the sliding button directly contacting the first and second circuit board contacts, one or more additional position sensors may be provided within or adjacent the vertical channel in the input device to detect vertical movement of the button in the y direction along the vertical channel. The position sensors can, for example, detect the magnet in the neck of the sliding button. Detection of vertical movement can send signals and instructions directly or indirectly to the mobile phone to perform a pre-determined function.

As noted above, the input device can be configured to allow a user to provide tactile input to the electronic device to perform a particular function. For example, the input device can be used to initiate an action or discontinue an action or function based on the position of the button at a certain location, as well as the depression of the button at a particular location.

In one example, the input device initiates an action when the sliding button is used as follows: (1) sliding button is depressed in the resting position; (2) sliding button is depressed and held down in the resting position; (3) sliding button is depressed sequentially two or more times; (4) a button or touch sensor is contacted.

The input device can further cancel or discontinue an action or application when the button is used as follows: (1) sliding button is slid from the resting position to an actuated position; (2) sliding button is slid from the resting position to an actuated position and further depressed in the actuated position; (3) sliding button is slid from the resting position to an actuated positioned and depressed in the actuated position for a prolonged time period; (4) a second button or touch sensor is contacted.

In another example, the sliding button can be used to first cancel and then initiate another function when the sliding button is slid from the resting position to the actuated position, and then sequentially depressed in the second stationary position at least two or more times or held down for a prolonged period of time.

Other hardware can be used to support a click and slide motion, as well as other user input gestures noted herein. For instance, the input device of the audio device may additionally or alternatively include touch-based and/or pressure sensitive input, including touch-based and/or pressure sensitive sensors and circuitry. Touch-sensitive and/or pressure sensitive circuitry and sensors may be disposed within the housing such that at least a portion of the outer wall of the housing is configured as a touch-based and/or pressure sensitive input surface. A user may, for example, tap the touch based and/or pressure sensitive input surface or hold a finger for a prolonged period of time, instead of clicking or holding down the button. Additionally, a user may slide a finger across a length of the touch and/or pressure input surface to cancel an action, instead of sliding a button.

Example Methods

As noted above, the input device can be used to initiate and cancel or discontinue an action being performed by the client computing device 110 or 120. Positive controls associated with initiating an action are included in the input device. Positive controls include play/pause, fetching updates from a personal itinerary, confirming actions, turning on the microphone for audio input, etc. One or more buttons of the input device may be used to provide user input. For example, clicking a button of the input device, as shown by the asterisk in FIG. 5, may turn on music. When provided with an option for an action, the one or more processors may provide for a length of time for a user to respond. An example of options may be "You have a meeting at 4:00 pm. It is now 4:30 pm. Would you like another reminder at 4:45 pm?" or "You have 4 new messages. Would you like to hear them?" In these instances, the button may also be clicked once as the user response to initiate the action in the provided option.

The one or more buttons may also be double-clicked to provide a different user input. Double-clicking the buttons indicated in FIG. 5, for example, may request an audio update from an itinerary or stored messages, regardless of what action is being performed by the one or more processors at the time.

In addition, the one or more buttons may be pressed down and held to request a different action than clicking or double-clicking. For example, pressing and holding one of the buttons indicated in FIG. 5 may open the microphone for a user to provide audio input to the one or more processors. The audio input may be commands that may be parsed by the one or more processors as actions to perform, or may be audio messages to be sent by the one or more processors.

Hush controls associated with canceling or discontinuing an action being performed by client computing device 110 or 120 is included in the input device. The hush control gesture is distinct from the positive control gesture. Rather than a clicking gesture, the hush control gesture comprises a slide or a squeeze, which are more related to an act of dismissing an action or muffling a sound. In other examples where the input device does not have a sliding button or touch sensors located on the sides of an input device, the gesture for the hush control may be pressing a different button than the positive control. Hush controls are useful to quickly dismiss any incoming messages or reminders that are unnecessary or disruptive to the user. For example, the computing device 110 or 120 may receive a text message and automatically initiate reading of the text message via an audio accessory. As shown in FIG. 6, the text message reading may be stopped by sliding a button in the input device or squeezing the sides of the input device where touch sensors are located.

As shown in FIG. 7, hush controls may also be used to skip through a list of items, such as messages, music tracks, or radio stations. For example, a user may double-click a button to receive updates from stored messages, and as messages are being read, the hush control may be performed to skip to a next message in the list of stored messages. When listening to music or podcasts, the hush control may be used to skip to a next track in the list.

A variation of the hush control may be used to skip at a higher level or a fast forward action. The variation may be a slide and hold or squeeze and hold gesture. The one or more processors may detect the slide/squeeze and hold gesture by detecting constant pressure on the input device and determine a length of time the pressure is held. After a predetermined amount of time, the one or more processors may perform the higher level skip or fast forward. For example, a higher level skip may be skipping through different podcasts rather than tracks within the same podcast or skipping through different albums rather than tracks within the same album. The slide/squeeze and hold gesture may also be used for a fast forward action and may jump forward in time of a musical track, for example, for a set amount of time.

In the context of updates and messages, the variation of the hush control may be used to permanently silence certain updates and messages. While the hush control may skip the update or message being read at the moment to be read at a later time, the variation of the hush control may cause the update or message to be skipped and marked for no future reading.

In some examples, the skip control may be a separate button on the input device.

Some input devices may also include a previous control, as shown in FIG. 8. The previous control may be a separate button from the positive control and the skip control. In other examples may be a slide gesture in an opposite direction of the hush/skip slide gesture. The previous control is useful in navigating back to re-listen to a music track or message. When the previous control is repeated one or more times, the one or more processor may navigate to a previous music track or message. When the previous control is held for a predetermined period of time, the one or more processors may navigate backwards at a higher level, such as albums or stations, or may rewind a set amount of time.

A first example workflow according to the methods described above includes the following steps. A user may start a run. The client computing device may detect the run activity based on information provided by the user, such as steps, heartbeat, location, etc. An audio notification may be played indicating that the activity has been detected. A positive control gesture, such as pressing button 310, 330, 344, 370, or 388, may be received. In response to the positive control gesture, the client computing device may read a list of actions the client computing device may perform and instructions to select an action from the list. For example, the client computing device may provide the option to track the run and listen to a playlist and provide instructions to click the positive control to choose this option. A click may be received at the positive control as or after the option is provided, in which case the client computing device commences tracking the user's run and playing the playlist. An audio notification may be played confirming the commencement of the action.

While performing the action, another notification may be played, such as an audio notification of a received message from a particular person. The volume of the playlist may be reduced when the audio notification is played. The positive control may be clicked as or after the audio notification for the message is played, and in response, the message is read while maintaining or further reducing the volume of the playlist. While the message is read aloud, a hush control gesture may be received, and the client computing device may stop the message. The hush control gesture may be, for example, sliding a button, such as buttons 308 and 342, from a resting position to an actuated position, squeezing an input device, such as input devices 328, 366, or pressing a second button different from the button associated with the positive control, such as button 389. When the message is stopped, the volume of the playlist may resume the original volume.

The client computing device may detect an end to the run activity based on the information provided by the user, such as steps stopping, heartbeat slowing, location being near the start location, etc. When the end to the run activity is detected, the client computing device may provide an audio summary of the run activity. For example, the client computing device may provide information related to the steps taken, distance, time elapsed, calories burned, etc.

When a sliding button is moved from a resting position to the actuated position and held in the actuated position while the playlist is playing, the client computing device may cycle through a list of stations, playlists, podcasts, or other audio experience, reciting the title or playing a beginning clip of each in turn. The cycle may continue until the sliding button is released from the actuated position. The audio experience whose title or clip was played prior to the release of the sliding button may continue to play.

A second example workflow according to the methods described above includes the following steps. A second positive control gesture, such as double-clicking button 310, 330, 344, 370, or 388, may be received. The second positive control gesture may indicate a request for updates. In response to the second positive control gesture, the client computing device may read aloud a series of updates based on time of day, location, or user preferences. For example, when the second positive control gesture is received at 8:00 am, the series of updates may include the time, the weather for a current location, review of voice messages, a list of upcoming scheduled events for the day, a review of unread emails, and news stories of the day.

When a hush or skip control gesture is received, a currently playing update may be stopped, and a next update may be played. The hush or skip control gesture may be, for example, sliding button 310, 344 to a first actuated position, squeezing input devices 328, 366, or pressing a second button 372, 389 different from the button associated with the second positive control gesture. For example, the weather for the current location is played until the hush control gesture is received, at which point the client computing device may stop playing the weather and start playing the review of voice messages.

A previous control gesture, such as sliding button 344 upwards to a second actuated position or pressing a third button 368, may be received as an update is played and cause the update to be played from the beginning. For example, as the review of voice messages plays, the previous control gesture may be received. In the response, the currently played voice message may be played from the beginning.

When an update ends either by receiving a hush or skip control gesture or by completing the update, the next update may automatically be read aloud. For example, when the review of voice messages is completed, the list of upcoming scheduled events for the day may be played. A hush or skip control may be received while the list is played, and the client computing device may start to play the review unread emails. A hush or skip control may be received as the review of unread emails, and the client computing device may provide an option to hear the news stories of the day. The positive control gesture, such as clicking button 310, 330, 344, 370, or 388, may be received as an indication to accept the option to play the news stories of the day, and the client computing device may start to play the news stories.

A positive control gesture related to providing verbal instructions to the client computing device may be received, such as pressing and holding button 310, 330, 344, 370, or 388 for a predetermined time. For example, after a notification is played by the client computing device related to an upcoming scheduled event, button 310, 330, 344, 370, or 388 may be pressed and held for more than one second, the client computing device may play a chime and prepare to receive verbal instructions, such as by activating a microphone. After the user provides verbal instructions, the client computing device may determine steps to perform in relation to the instructions and confirm the steps by playing a summary of the steps. For example, a user may say, "remind me to add the sales figured to the presentation when I get to work," and the client computing device may provide the audio, "got it, would you like to save this reminder?" The user may respond by saying "yes" or providing the positive control gesture, and the client computing device may provide the audio "ok, it's saved."

At a later point in the day, while music is being played, a message may be received at the client computing device. The music may be stopped and a notification for the message may be played, followed by an audio of the message, such as an audio of a voice message or a text-to-speech version of a text message. Shortly after the message is played, such as within one or two seconds, the second positive control gesture may be received. A series of updates may be played, starting with the current time and followed by a replay of the message that was played just a few second prior. In some implementations, the message may be played when there are no new updates regardless of temporal proximity to the second positive control gesture. A hush control variation, such as sliding and holding button 310, 344 or squeezing and holding input device 328, 366, may be received and detected by the client computing device while the message is being replayed. In response to the hush control variation, the client computing device may stop replaying the message and either delete the message or remove the message from updates. The music may then be resumed.

A third example workflow according to the methods described above includes the following steps. A song played by the client computing device may be nearing an end. A previous control gesture may be received by the client computing device while the song is still playing. The previous control gesture may be, for example, sliding button 344 upwards to a second actuated position or pressing a third button 368. A first message may be received at the client computing device. The music may be stopped and a notification for the message may be played, followed by an option to listen to the first message. A positive control gesture may be received by the client computing device within a predetermined amount of time in response to the option to listen to the first message. The first message may be played as an audio of a voice message, a text-to-speech version of a text message. After the first message is played, the music may resume where it was previously stopped. Volume for the music may be adjusted based on input from the user by using volume controls, such as volume controls 332, 312, 372.

A second message may be received at the client computing device. The music may be stopped and a notification for the second message may be played, followed by the audio of the second message. The option to listen to the message is not played after the first message was selected to play. After the second message I played, the music may resume where it was previously stopped.

At a later point in time as another song is playing, a positive control gesture related to providing verbal instructions to the client computing device may be received by the client computing device, such as pressing and holding button 310, 330, 344, 370, or 388 for more than one second. In response, the client computing device may play a chime and prepare to receive verbal instructions, such as by activating a microphone. After the user provides verbal instructions, the client computing device may determine steps to perform in relation to the instructions and confirm the steps by playing a summary of the steps. In this example, the verbal instructions may be, "share this track with London crew on messaging app." The client computing device may determine that the steps include sending the song that was playing to the London crew group via the messaging app. Further, the client computing device may provide a further option to send a message with the song via the messaging app. Additional verbal instructions may accept the further option and provide text of the message, such as "I can't stop listening to this track." The client computing device may then send the song with the aforementioned message via the messaging app.

A second positive control gesture, such as double-clicking button 310, 330, 344, 370, or 388, may be received to request updates at a further point in time. In response to the second positive control gesture, the client computing device may read aloud a series of updates including the time and a list of upcoming scheduled events for the day. An upcoming scheduled event may include a meet-up with friends indicated to be at a particular restaurant. After the meet-up event is read aloud, another positive control gesture related to providing verbal instructions to the client computing device may be received. The verbal instructions may be to "navigate there," where "there" is determined by the client computing device to be the location related to last-read event, or the particular restaurant in this scenario. In response, the client computing device may determine or receive navigation instructions to the particular restaurant, and may provide the navigation instructions as the client computing device is moved through space.

As the client computing device provides navigation instructions to the particular restaurant, a message may be received, and the client computing device may play a notification of the message and the audio of the message. A hush control variation, such as sliding and holding button 310, 344 or squeezing and holding input device 328, 366, may be received and detected by the client computing device while the message is being played. In response to the hush control variation, the client computing device may stop playing the message and either delete the message or remove the message from updates. Music and/or navigation instructions may be resumed.

Figure 9:
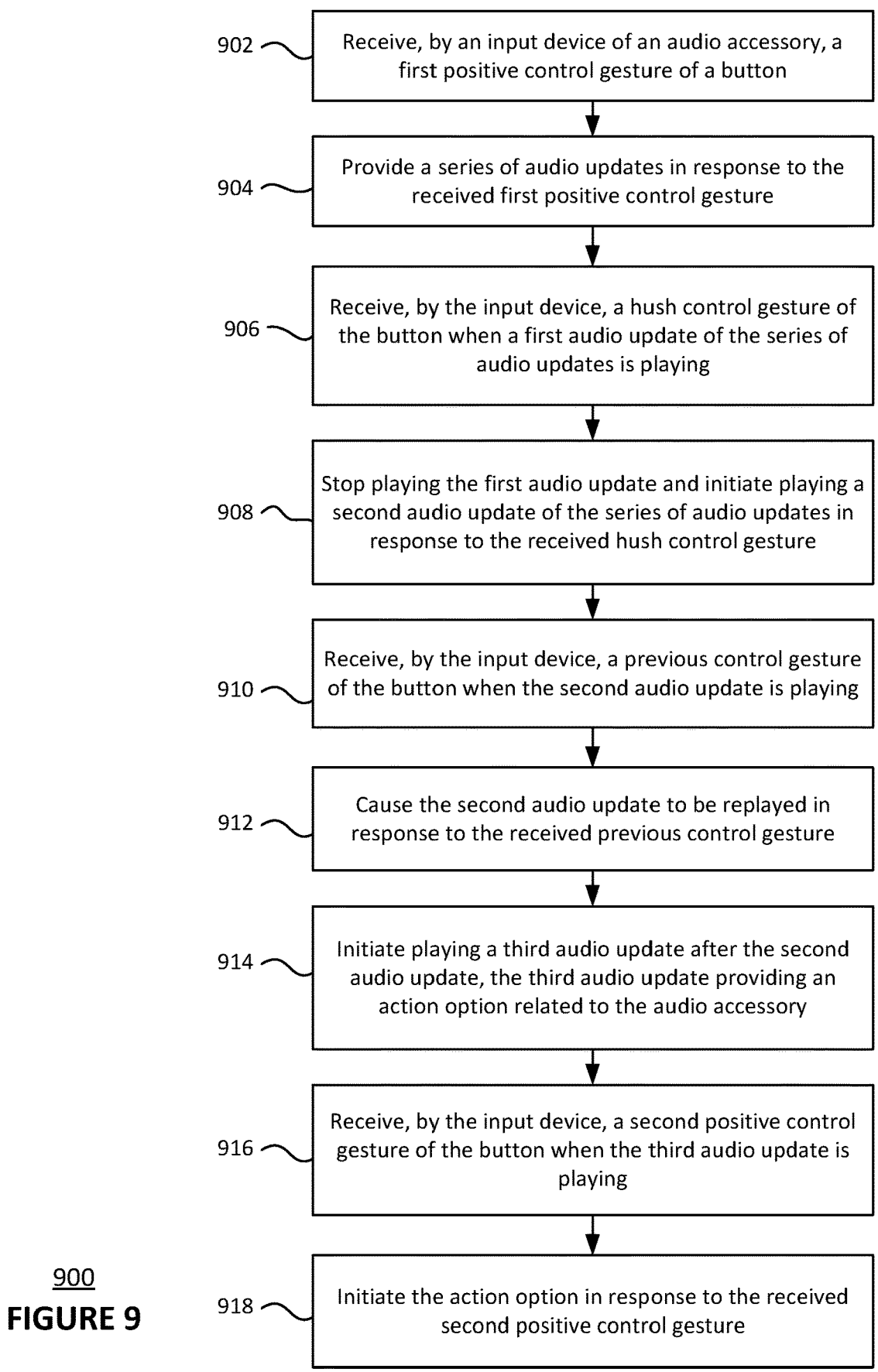
FIG. 9 illustrates an example flow diagram in accordance with aspects of the disclosure.

FIG. 9 illustrates an example flow diagram 900 is shown in accordance with some of the aspects described above that may be performed by the one or more processors of the audio accessories described above. While FIG. 9 shows blocks in a particular order, the order may be varied and that multiple operations may be performed simultaneously. Also, operations may be added or omitted.

At block 902, an input device of an audio accessory may receive a first positive control gesture of a button. The first positive control gesture may be, for example, double-clicking the button. At block 904, the one or more processors may provide a series of audio updates in response to the received first positive control gesture. The audio updates may be retrieved from a memory of a client computing device or received from one or more processors of the client computing device. The one or more processors may provide the series of audio updates by causing the audio updates to be played through earbuds or earphones of the audio accessory.

At block 906, the input device may receive a hush control gesture of the button when a first audio update of the series of audio updates is playing. The hush control gesture may be, for example, sliding the button from a rest position to an actuated position through a channel of the input device. At block 908, the one or more processors may cause the first audio update to stop playing and initiate playing a second audio update of the series of audio updates in response to receiving the hush control gesture. The one or more processors may cause the first audio update to stop playing by sending a communication to the client computing device with instructions to stop playing the first audio update. Likewise, the communication sent to the client computing device may also include instructions to initiated playing the second audio update in the series of audio updates. The second audio update may be received from the client computing device and caused to play through the earbuds or earphones of the audio accessory.

At block 910, the input device may receive a previous control gesture of the button when the second audio update is playing. The previous control gesture of the button may be, for example, sliding the button from the rest position in an opposite direction from the actuated position to a second actuated position through the channel of the input device. At block 912, the one or more processors may cause the second audio update to be replayed from the beginning in response to receiving the previous control gesture. The one or more processors may cause the second audio update to be replayed by sending a communication to the client computing device with instructions to start playing the second audio update from the beginning. In other implementations, the second audio update may be replayed from a memory of the audio accessory.

At block 914, after the second audio update, the one or more processors may initiate playing a third audio update that provides an action option related to the audio accessory. As described above, the third audio update may be received from the client computing device and played through the earbuds or earphones of the audio accessory. The action option may be, for example, modifying an audio message, changing user preferences in relation to an audio message, or initiating or stopping an audio message. At block 916, the input device may receive a second positive control gesture of the button when the third audio update is playing. The second positive control gesture may be different from the first positive control gesture, for example, a single click of the button. At block 918, the one or more processors may initiate the action option in response to receiving the second positive control gesture. Initiating the action option may involve sending a communication to the client computing device with instructions to perform the action option or may involve performing the action option at the audio accessory.

Figure 10:
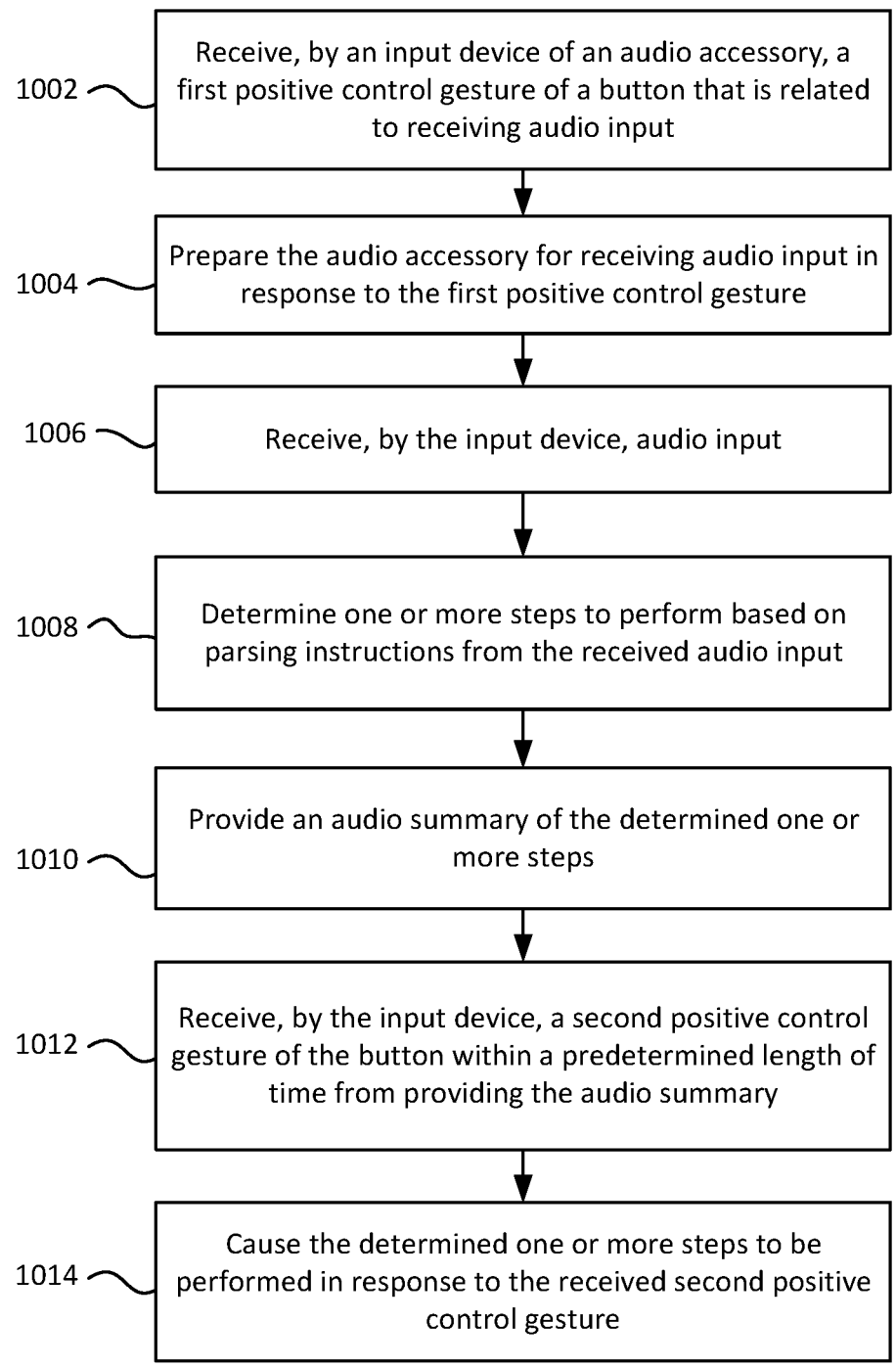
FIG. 10 illustrates another example flow diagram in accordance with aspects of the disclosure.

FIG. 10 illustrates another example flow diagram 1000 is shown in accordance with some of the aspects described above that may be performed by the one or more processors of the audio accessory. While FIG. 10 shows blocks in a particular order, the order may be varied and that multiple operations may be performed simultaneously. Also, operations may be added or omitted.

At block 1000, an input device of an audio accessory may receive a first positive control gesture of a button that is related to receiving audio input. The first positive control gesture may be, for example, pressing and holding the button down in a resting location for a predetermined amount of time. At block 1004, the one or more processors may prepare the audio accessory for receiving audio input in response to the first positive control gesture. Preparing the audio accessory for receiving audio input may include, for example, activating a microphone on the input device.

At block 1006, the audio input may be received by the input device. The audio input may be received within a set amount of time from when the first positive control gesture is received, such as one or two seconds. At block 1008, the one or more processors may determine one or more steps to perform based on parsing instructions from the received audio input. The one or more processors may parse instructions using speech recognition technology. In alternative implementations, the one or more processors of the audio accessory may send the received audio input to the client computing device, and the client computing device may perform the parsing and determining steps of block 1008.

At block 1010, the one or more processors of the audio accessory may provide an audio summary of the determined one or more steps. In some examples, the one or more processor may receive the audio summary from the client computing device and cause the earbuds and earphones to play the audio summary. At block 1012, the input device may receive a second positive control gesture of the button with a predetermined length of time from providing the audio summary. The second positive control gesture may be different from the first positive control gesture, such as a single click of the button. At block 1014, the one or more processors, may cause the determined one or more steps to be performed in response to receiving the second positive control gesture. The one or more processors may perform the determined one or more steps or may send a communication to the client computing device with instructions for the client computing device to perform at least one of the determined one or more steps.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An audio accessory comprising:
a pair of earbuds;
an input device including a button, the button being configured to slide between a resting position and an actuated position; and
one or more processors operatively coupled to the pair of earbuds and the input device, the one or more processors being configured to:
   initiate an action when a click of the button is received by the input device;
   provide audio updates when a double-click of the button is received by the input device;
   prepare the input device to receive audio input when a prolonged click of the button is received;
   silence a currently playing audio message and initiate playing a next audio message through the pair of earbuds when a slide of the button to the actuated position is received by the input device; and
   silence the currently playing audio message and mark the currently playing audio message for no further playback when a prolonged hold of the button at the actuated position is received by the input device.

2. The audio accessory of claim 1, wherein:
the button is also configured to slide between the resting position and a second actuated position; and
the one or more processors are configured to play a previous audio message when a slide of the button to the second actuated position is received.

3. The audio accessory of claim 1, wherein when the click of the button is received after an audio message suggesting a given action has been played through the pair of earbuds, the initiated action is the given action.

4. The audio accessory of claim 1, wherein the provided audio updates are based on one or more of time of day, location, and a user preference.

5. The audio accessory of claim 1, wherein the one or more processors are configured to prepare the input device to receive audio input by activating a microphone of the audio accessory.

6. The audio accessory of claim 1, wherein the one or more processors are further configured to initiate playing a previous audio message when the slide of the button to the actuated position is received by the input device and there is no additional next audio message.

7. The audio accessory of claim 1, wherein the one or more processors are in communication with a memory of a client computing device, the memory storing one or more of the audio updates and audio messages that are configured to be played using the audio accessory.

8. An audio accessory comprising:
a pair of earbuds;
an input device including a button and two touch sensors on opposite sides of the input device, the two touch sensors being positioned to either side of the button; and
one or more processors operatively coupled to the pair of earbuds and the input device, the one or more processors being configured to:
   initiate an action when a click of the button is received by the input device;
   provide audio updates when a double-click of the button is received by the input device;
   prepare the input device to receive audio input when a prolonged click of the button is received;
   silence a currently playing audio message and initiate playing a next audio message through the pair of earbuds when tactile input is received at the two touch sensors of the input device; and silence the currently playing audio message and mark the currently playing audio message for no further playback when prolonged tactile input is received at the two touch sensors by the input device.

9. The audio accessory of claim 8, wherein when the click of the button is received after an audio message suggesting a given action has been played through the pair of earbuds, the initiated action is the given action.

10. The audio accessory of claim 8, wherein the provided audio updates are based on one or more of time of day, location, and a user preference.

11. The audio accessory of claim 8, wherein the one or more processors are configured to prepare the input device to receive audio input by activating a microphone of the audio accessory.

12. The audio accessory of claim 8, wherein the one or more processors are further configured to initiate playing a previous audio message when the slide of the button to the actuated position is received by the input device and there is no additional next audio message.

13. The audio accessory of claim 8, wherein the one or more processors are in communication with a memory of a client computing device, the memory storing one or more of the audio updates and audio messages that are configured to be played using the audio accessory.

14. An audio accessory comprising:
a pair of earphones, each earphone having an outer surface, an inner surface opposite the outer surface, and a sidewall connecting the outer surface and the inner surface;
an input device including a button, the button and two touch sensors on opposite sides of the input device, the two touch sensors being positioned to either side of the button; and
one or more processors operatively coupled to the pair of earphones and the input device, the one or more processors being configured to:
initiate an action when a click of the button is received by the input device;
provide audio updates when a double-click of the button is received by the input device;
prepare the input device to receive audio input when a prolonged click of the button is received;
silence a currently playing audio message and initiate playing a next audio message through the pair of earphones when tactile input is received at the two touch sensors of the input device; and
silence the currently playing audio message and mark the currently playing audio message for no further playback when prolonged tactile input is received at the two touch sensors by the input device.

15. The audio accessory of claim 14, wherein:
the input device includes a second button; and
the one or more processors is configured to initiate playing a next audio message when a click of the second button is received by the input device.

16. The audio accessory of claim 15, wherein:
the input device includes a third button; and
the one or more processors is configured to initiate playing a previous audio message when a click of the third button is received by the input device.

17. The audio accessory of claim 14, wherein when the click of the button is received after an audio message suggesting a given action has been played through the pair of earphones, the initiated action is the given action.

18. The audio accessory of claim 14, wherein the provided audio updates are based on one or more of time of day, location, and a user preference.

19. The audio accessory of claim 14, wherein the one or more processors are configured to prepare the input device to receive audio input by activating a microphone of the audio accessory.

20. The audio accessory of claim 14, wherein the one or more processors are further configured to initiate playing a previous audio message when the slide of the button to the actuated position is received by the input device and there is no additional next audio message.

* * * * *